(12) United States Patent
Chen

(10) Patent No.: US 7,377,479 B1
(45) Date of Patent: May 27, 2008

(54) POSITION RESTORING APPARATUS FOR AN OPEN AND CLOSE DEVICE

(76) Inventor: Shui-Ching Chen, No.81, Lane 355, San Kang Rd., Lung Ching Tsun, Lung Ching Hsiang, Taichung Hsien (TW) 434

( * ) Notice: Subject to any disclaimer, the term of this patent is extended or adjusted under 35 U.S.C. 154(b) by 0 days.

(21) Appl. No.: 11/564,028

(22) Filed: Nov. 28, 2006

(51) Int. Cl.
  *F16K 31/04* (2006.01)
(52) U.S. Cl. ............... 251/69; 251/129.11; 251/249.5; 251/250
(58) Field of Classification Search ........... 251/129.11, 251/129.12, 129.13, 249.5, 250, 68, 69, 70, 251/71, 74
See application file for complete search history.

(56) References Cited

U.S. PATENT DOCUMENTS

| | | | | |
|---|---|---|---|---|
| 3,104,862 A | * | 9/1963 | Pearson et al. ............. | 251/250 |
| 3,982,725 A | * | 9/1976 | Clark ......................... | 251/14 |
| 4,647,003 A | * | 3/1987 | Hilpert et al. .............. | 251/14 |
| 4,905,574 A | * | 3/1990 | Trevisan ..................... | 92/69 R |
| 5,325,888 A | * | 7/1994 | Stary ......................... | 251/250 |
| 5,440,969 A | * | 8/1995 | Shin ........................... | 92/68 |
| 5,950,427 A | * | 9/1999 | Demerjian et al. ......... | 60/404 |
| 6,173,740 B1 | * | 1/2001 | Marinoni et al. ........... | 251/250 |
| 6,488,260 B1 | * | 12/2002 | Dietz ......................... | 251/129.13 |

* cited by examiner

*Primary Examiner*—John Bastianelli

(57) ABSTRACT

A position restoring apparatus for an open and close device includes a casing base, a first actuating member, a second actuating member, a first end cover, a second end cover, an output shaft and a motor. The casing base has main member with a hollow seat. The first actuating member has a first disk part with a first block and a first rack at a lateral side of the first block. The second actuating member has a second disk part with a second block and a second rack. The first end cover provides a plurality of first elastic components. The second end cover provides a plurality of second elastic components. The output shaft provides a joining part to mesh with the first and second racks. The motor shaft extends upward a rod part with an electromagnet, a stationary disk member and a movable disk member.

20 Claims, 18 Drawing Sheets

POSITION RESTORING APPARATUS FOR AN OPEN AND CLOSE DEVICE

BACKGROUND OF THE INVENTION

1. Field of the Invention

The present invention is related to a valve or any other open and close apparatus and particularly to a position restoring apparatus for an open and close device.

2. Brief Description of the Related Art

In order to pursue fast speed and convenience, an open and close function of electrical actuation has been developed by the manufacturers for controlling ball valve, butterfly valve or other types of valves.

However, in case of the valves being required to shut urgently under a condition of emergency and happening to power failure or power off accidentally, how to close the valves immediately is a problem bothering the manufacturers and the users. Besides, sometimes, the users desire to operate the valves manually but it is not possible for them to enter the shop to operate open or close of the valves.

U.S. patent application Ser. No. 11/159,685 filed by the present inventor entitled "POSITION RETURN DEVICE FOR AN OPEN AND CLOSE APPARATUS" has been allowed. The feature of the prior art is in that a valve or any open and close apparatus can be returned to the original opening or closing state in case of power failure or power being off accidentally. However, when the valve or any open and close apparatus has to be changed to a state different from the original state before the power being on again, the prior art is incapable of dealing with the special need.

SUMMARY OF THE INVENTION

A primary object of the present invention is to provide a position return device for an open and close apparatus which is capable of returning the open and close apparatus to the original position thereof rapidly in case of power failure or power off accidentally.

Other object of the present invention is to provide a position restoring apparatus for an open and close device with which changing the original state of opening or closing manually after power failure or power off accidentally and closing and before the power being on again becomes practically feasible.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Referring to FIGS. 1 to 13, the first embodiment of a position restoring apparatus for an open and close device according to the present invention includes parts described hereinafter.

Figure 1:
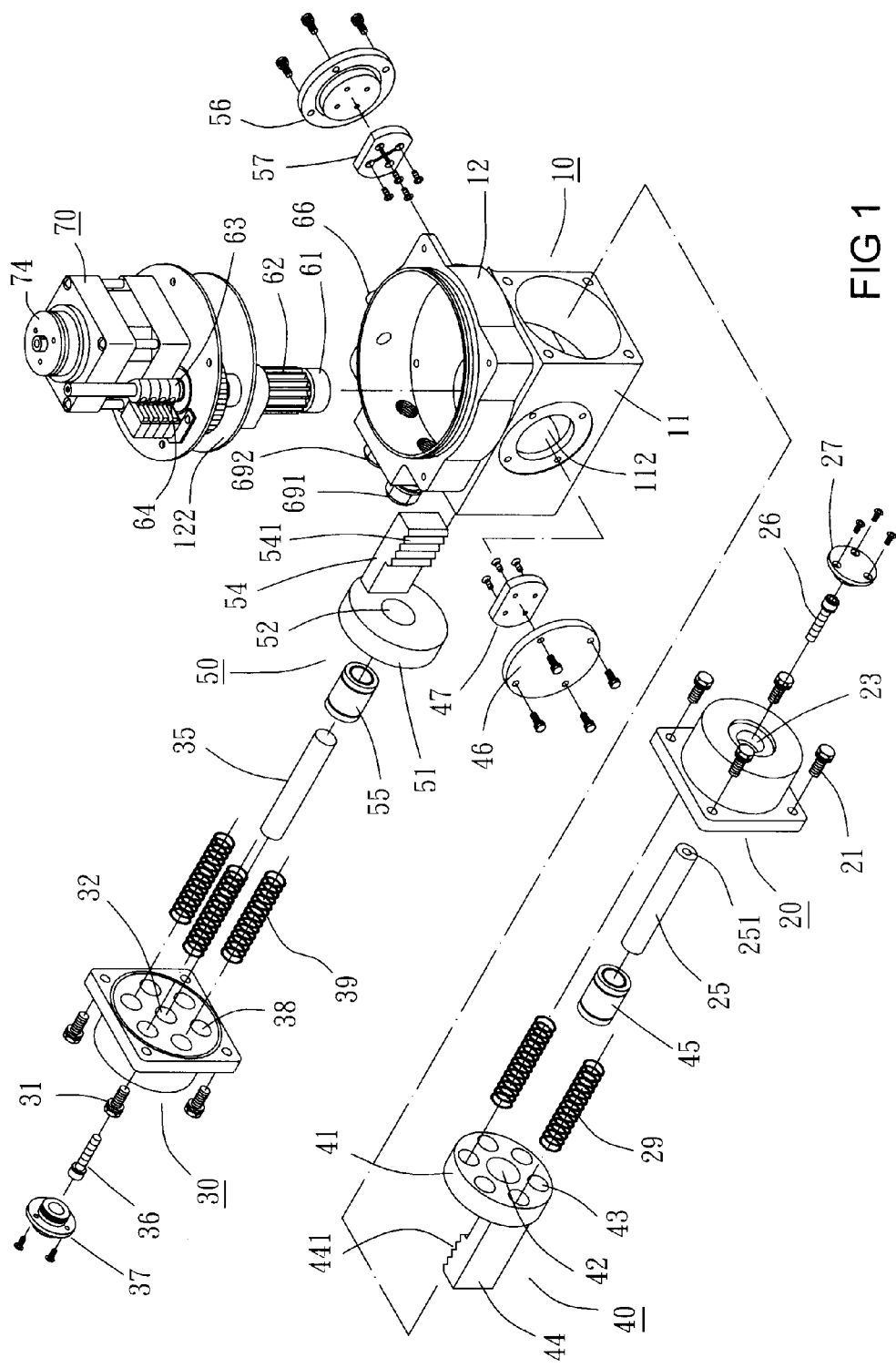
FIG. 1 is an exploded perspective view of a position restoring apparatus for an open and close device according to the present invention.
Figure 2:
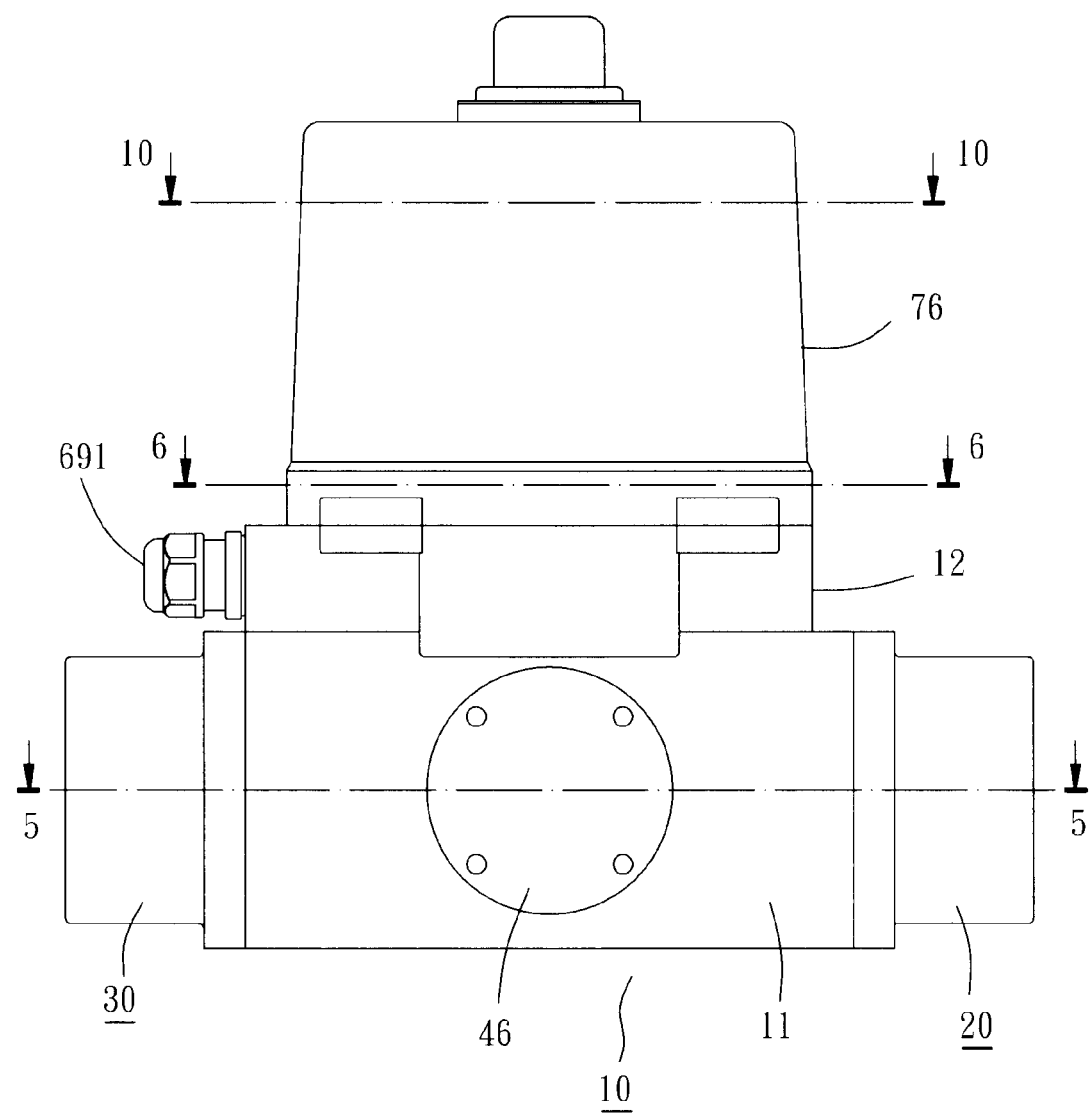
FIG. 2 is a front view of the position restoring apparatus for an open and close device shown in FIG. 1.
Figure 3:
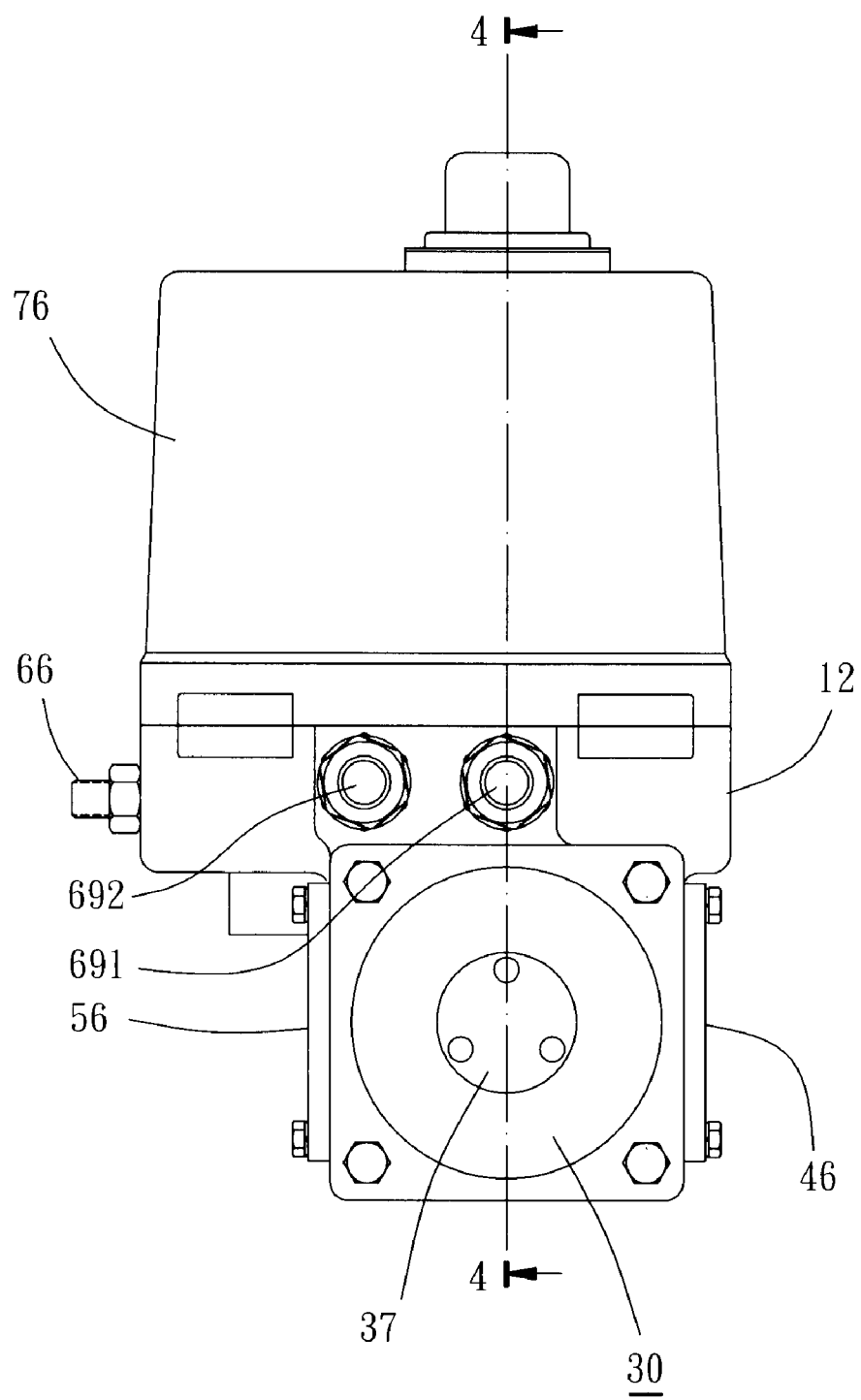
FIG. 3 is a left side view of the position restoring apparatus for an open and close device shown in FIG. 1.
Figure 4:
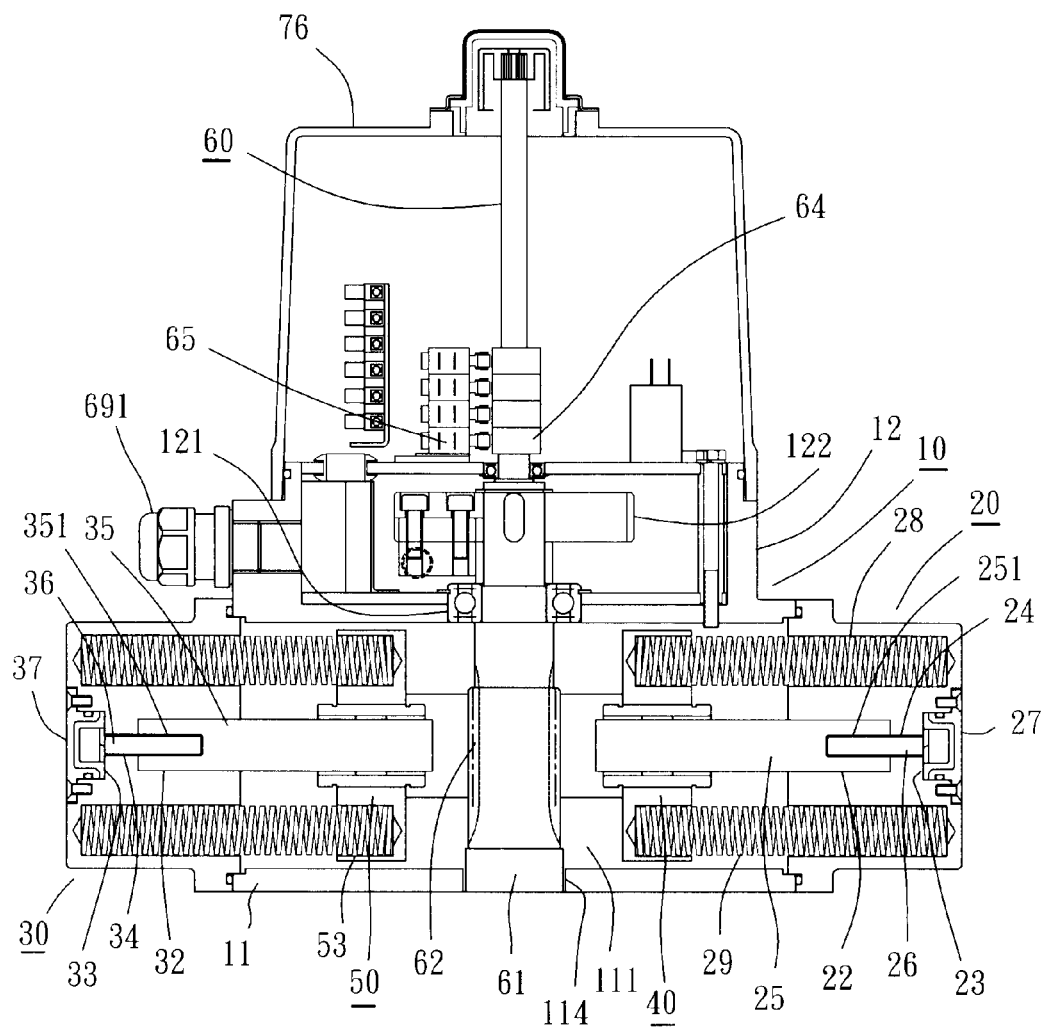
FIG. 4 is a sectional view along line 4-4 shown in FIG. 3.

A casing base 10 provides a rectangular main member 11 with a hollow seat 12 on top thereof. A long inner hole 111 extends along the axial axis of the main member 11 from the right side to the left side of the main member 11 and a front opening 112 is disposed at the front side of the main member 11 as shown in FIG. 1. A rear opening 113 is disposed at the rear side of the main member 11 to communicate with the inner hole 111. The bottom of the hollow seat 12 is a middle opening 121 communicating with the inner hole 111. A lower opening 114 is disposed at the bottom of the main member 11 corresponding to the middle opening 121 to communicate with the inner hole 111. A gear type speed reducer 122 is received in the hollow seat 12.

A first side cover 20 is attached to the right end side of the main member 11 with a plurality of first screw fasteners 21 to close the right end of the inner hole 111. The first side cover 20 has a first axial internal hole 22 and a first axial outer sink 23. A first middle small hole 24 is disposed between the first axial internal hole 22 and the first axial outer sink 23 such that the first axial internal hole 22 is capable of communicating with the first axial external sink 24. A first rod 25 fits with the first axial internal hole 22 with a first threaded hole 251 extending inward from the right end of the first rod 25. A second screw fastener 26 passes through the first middle small hole 24 from the first axial outer sink 23 to engage with the first threaded hole 251 of the first rod 25. A first circular cap 27 is attached to and closes the first axial outer sink 23. A plurality of first blind holes 28 are disposed to surround the first axial internal hole 251 in the first side cover 20 to accommodate a first elastic component 29 such as a spring respectively in a way of an end of the first elastic component 29 extending into the inner hole 111 of main member 11.

A second side cover 30 is attached to the left end side of the main member 11 with a plurality of third screw fasteners 31 to close the right end of the inner hole 111. The second side cover 30 has a second axial internal hole 32 and a second axial outer sink 33. A second middle small hole 34 is disposed between the second axial internal hole 32 and the second axial outer sink 33 such that the second axial internal hole 32 is capable of communicating with the second axial external sink 34. A second rod 35 fits with the second axial internal hole 32 with a second threaded hole 351 extending inward from the left end of the second rod 35. A fourth screw fastener 36 passes through the second middle small hole 34 from the second axial outer sink 33 to engage with the second threaded hole 351 of the second rod 35. A second circular cap 37 is attached to and closes the second axial outer sink 33. A plurality of second blind holes 38 are disposed to surround the second axial internal hole 351 in the second side cover 30 to accommodate a second elastic component 39 such as a spring respectively in a way of an end of the second elastic component 39 extending into the inner hole 111 of the main member 11.

A first actuating member 40 has a first disk part 41 with a first central hole 42 and a plurality of third blind holes 43 surrounding the central hole 42 to correspond to the first blind holes 28. A first elongated block 44 extends from a facial side of the first disk part 41 parallel to the axial line of the first disk part 41 with a first rack section 441 provided at a lateral side of the block 44. The central hole 42 of the block 44 is movably attached to a section of the first rod 25, which extends outward the first axial internal hole 22 with a first oily bearing 45 being arranged between the first central hole 42 and the first rod 24 for enhancing smoothness while the first disk 41 sliding. A circular front cap 46 is attached to the front opening 112 of the casing base 10 and a first contact piece 47, which is made of soft metal such as copper, is attached to the rear side of the front cap 46 to pressingly touch a lateral side of the block 44, which is opposite to the lateral side with the first rack 441.

A second actuating member 50 has a second disk part 51 with a second central hole 52 and a plurality of fourth blind holes 53 surrounding the second central hole 52 to correspond to the second blind holes 38. A second elongated block 54 extends from a facial side of the second disk part 51 parallel to the axial line of the second disk part 51 with a second rack section 541 provided at a lateral side of the block 44. The second central hole 52 of the second block 54 is movably attached to a section of the second rod 35, which extends outward the second axial internal hole 32 with a second oily bearing 55 being arranged between the second central hole 52 and the second rod 34 for enhancing smoothness while the second disk 51 sliding. A circular rear cap 56 is attached to the rear opening 113 of the casing base 10 and a second contact piece 57, which is made of soft metal such as copper, is attached to the front side of the rear cap 56 to pressingly touch a lateral side of the second block 54, which is opposite to the lateral side with the second rack 541.

Figure 7:
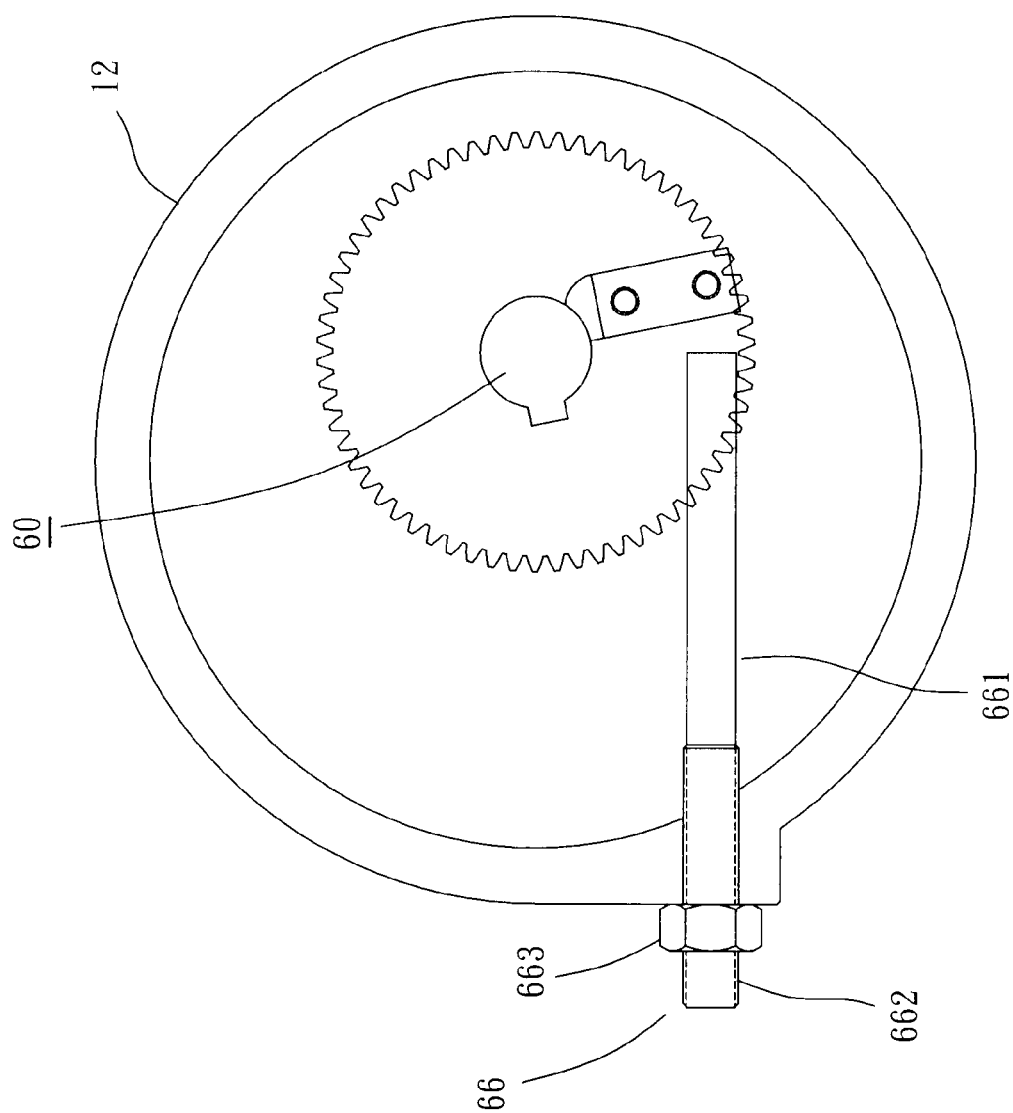
FIG. 7 is a plan view illustrating damping device 66 shown in FIGS. 1, 3 and 6.
Figure 8:
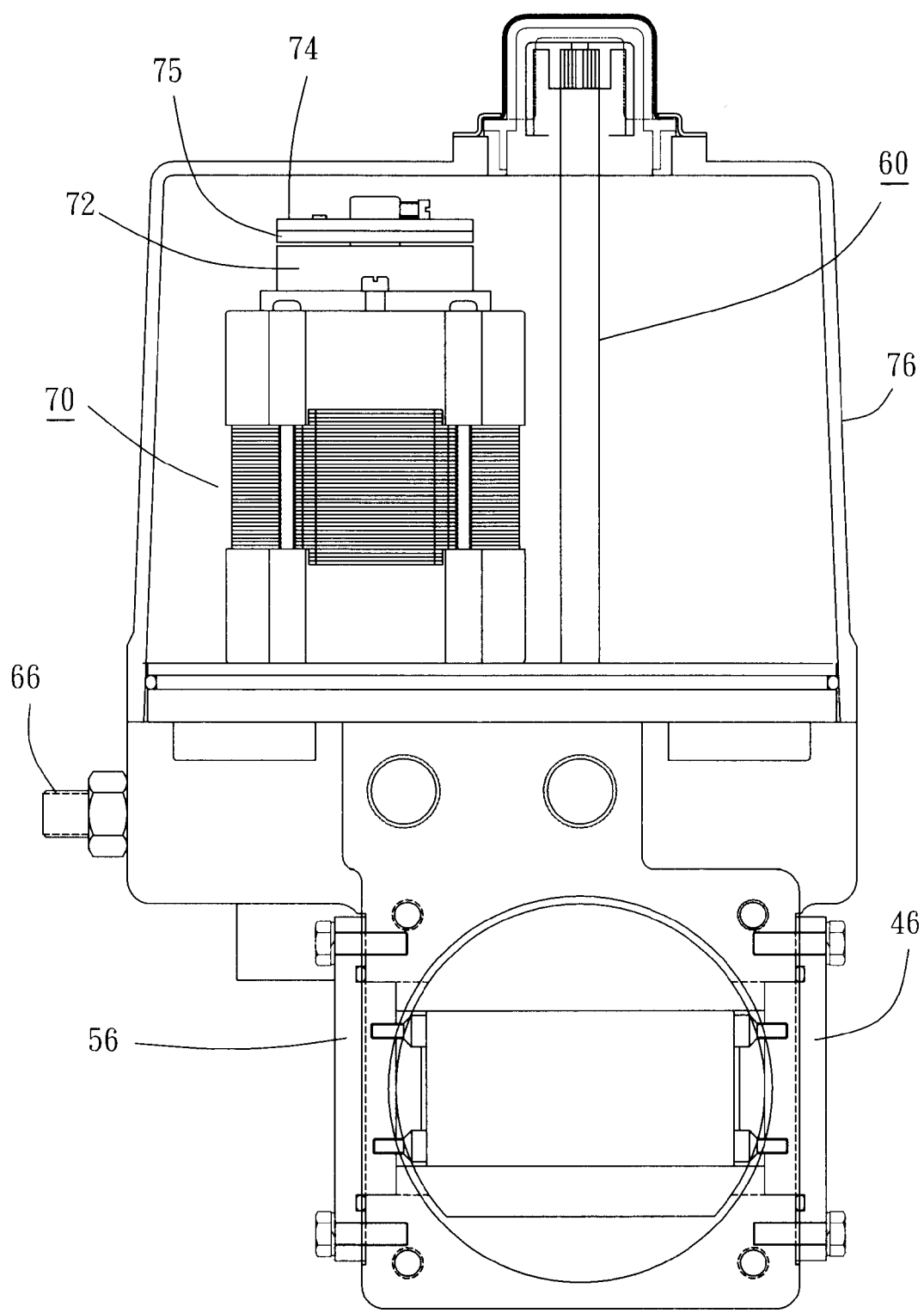
FIG. 8 is a plan view illustrating the motor 70 under the cover 76.
Figure 9:
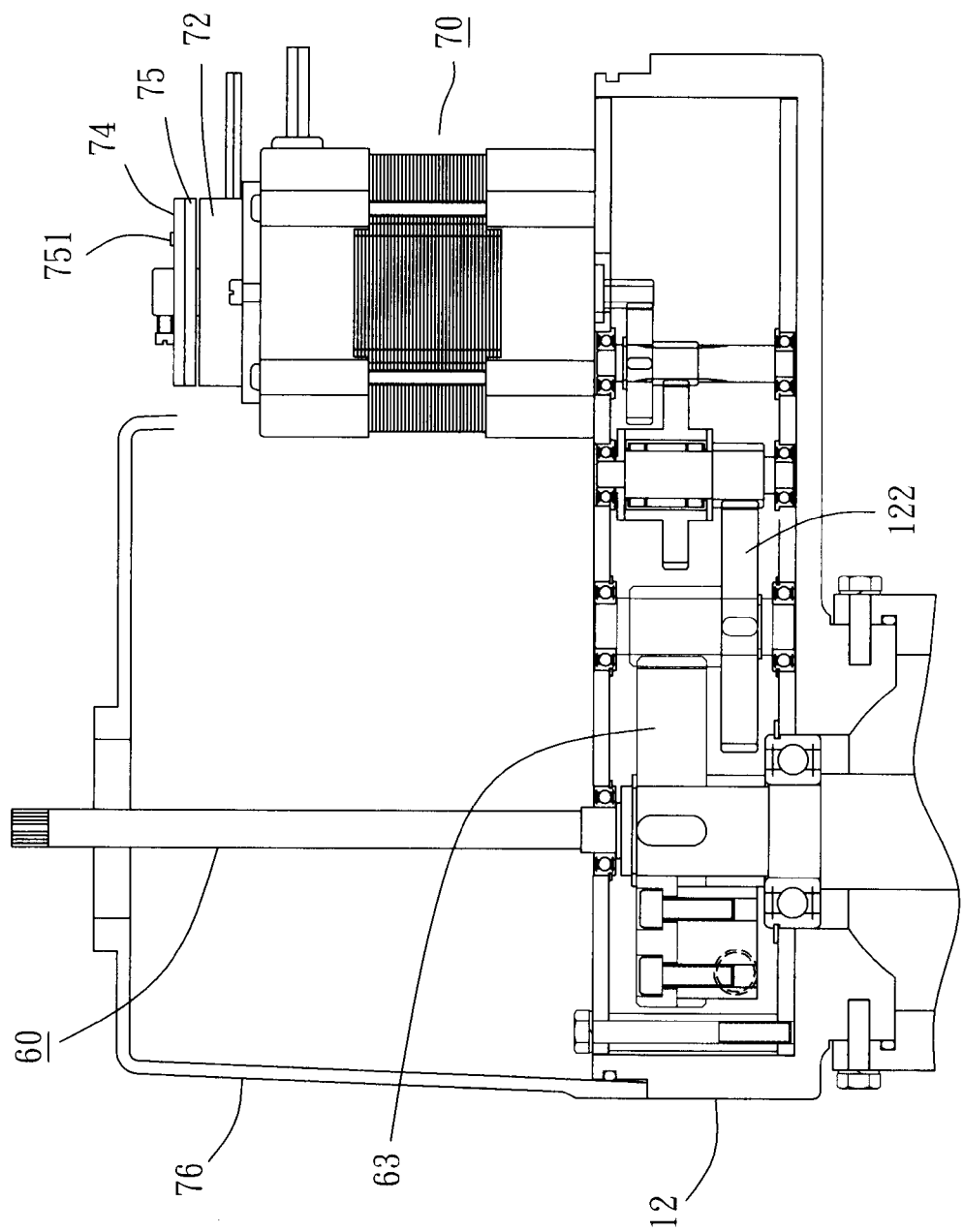
FIG. 9 is a plan view illustrating the gear train in the gear type speed reducer 122.
Figure 10:
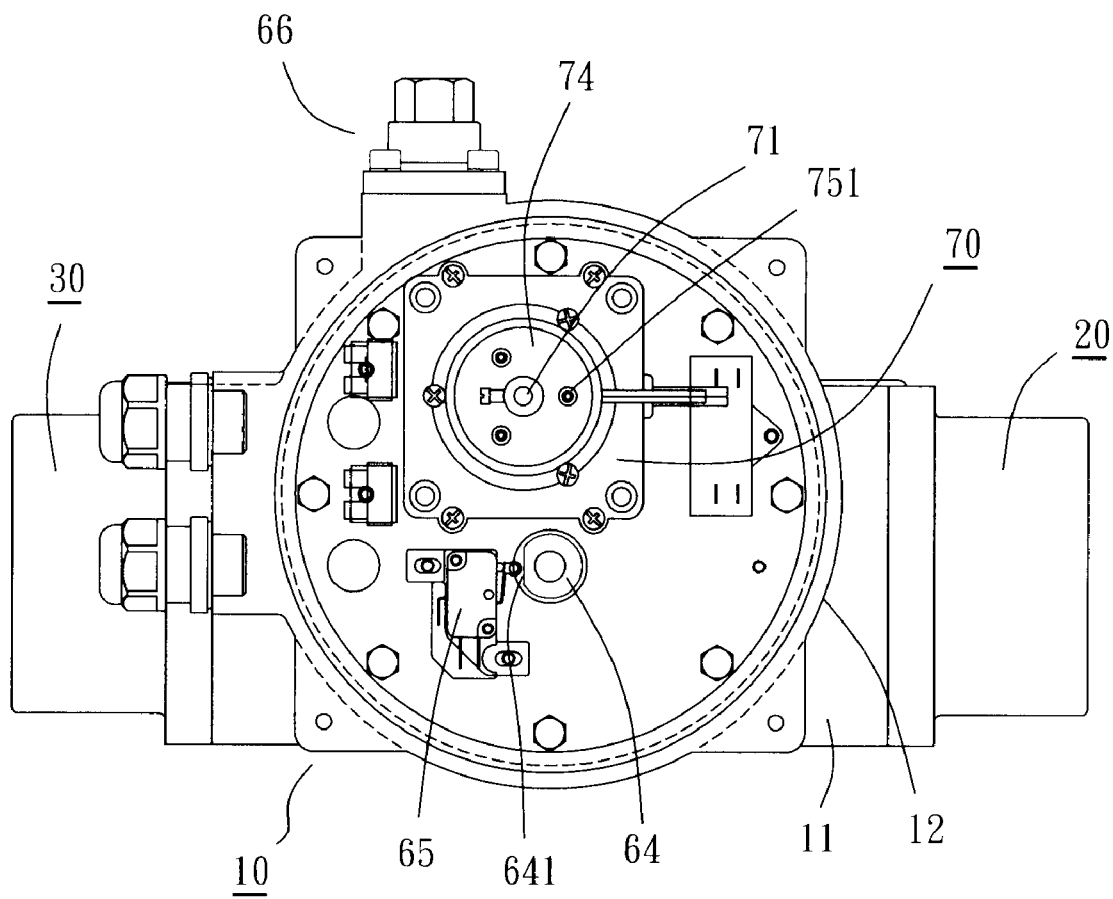
FIG. 10 is sectional view along line 10-10 shown in FIG. 2.
Figure 12:
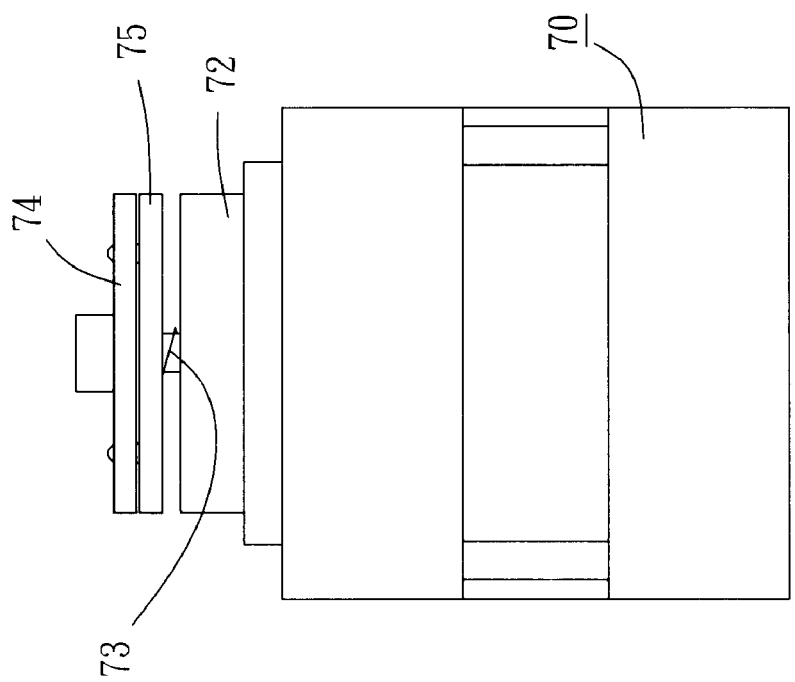
FIG. 12 is a side view of the motor 70.
Figure 11:
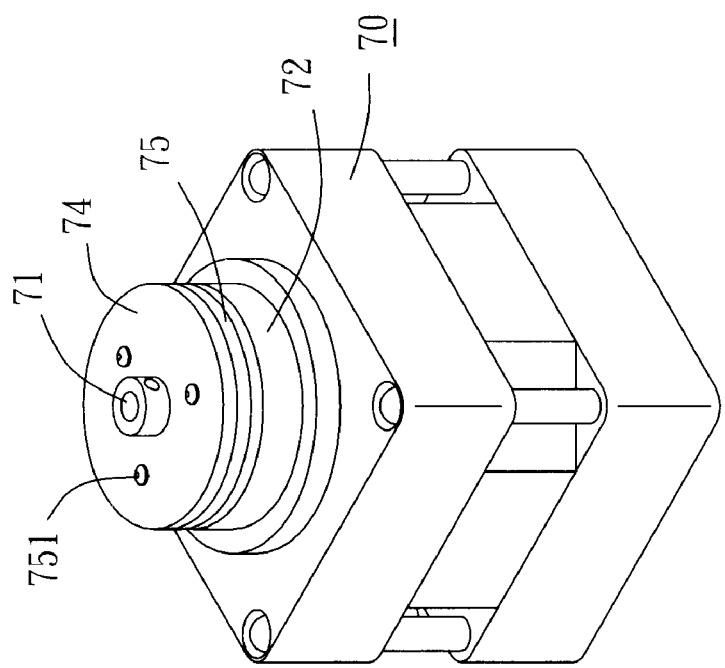
FIG. 11 is a perspective view of the motor 70.

An output shaft 60 has a joining part 61 at the lower end thereof to movably connect with the lower opening 114 of the main member 11 for being attached to an operated valve or an open and any other close device. The joining part 61 has a gear part 62 to mesh with the first rack 441 and the second rack 541 respectively. The output shaft 60 has a gear 63 is disposed in the hollow seat 12 as shown in FIG. 9 to mesh with the terminal gear of the gear type speed reducer 122. The upper section of the output shaft 60 has a cam 64 with a flat portion 641 and a micro switch 65 is provided next to the cam 64. Further, a damping device 66 is joined to the middle section of the output shaft 60 as shown in FIG. 7. The damping device 66 has body part 661 with a outer threaded section 662 for being fastened with a nut 663 once the damping device 66 is adjustably set to prevent from loosening.

A motor 70 is disposed in the hollow seat 12 as shown in FIG. 9 and the initial gear of the speed reducer 122 is attached to an end of the motor shaft. Another end of the motor shaft extends a rod part 71 with an electromagnet 72 fixedly joined to the lower portion of the rod part 71. A spring 73 is disposed at the center of the electromagnet 72 and surrounds the motor shaft. The rod part 71 is secured with a stationary disk 74 at the upper end thereof and the stationary disk 74 has three holes 741 spacing apart from each other. A movable disk 75 is disposed under the stationary disk 74 and biased against the spring 73 and provides three sticks 751 corresponding to the holes 741 such that the sticks 751 insert through the holes 741. An upper cover 76 closes the hollow seat 12. A power lead wire entry 691 and a signal lead wire entry 692 are provided at a lateral side of the hollow seat 12.

Figure 15:
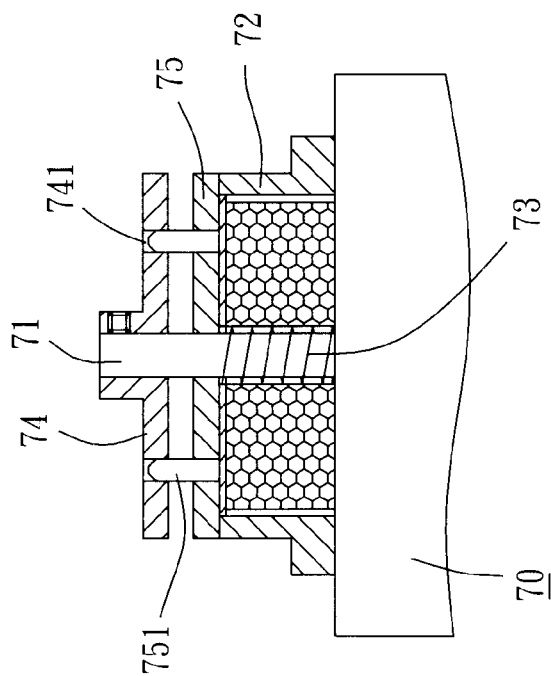
FIG. 15 is a sectional view illustrating the electromagnet 72 attracting the movable disk 75.
Figure 13:
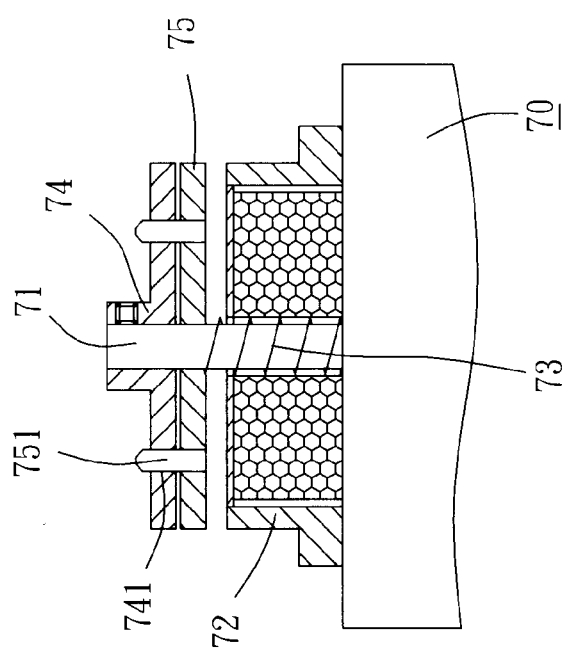
FIG. 13 is a sectional view illustrating arrangement of the electromagnet 72, the movable disk 75 and the stationary disk 74.
Figure 14:
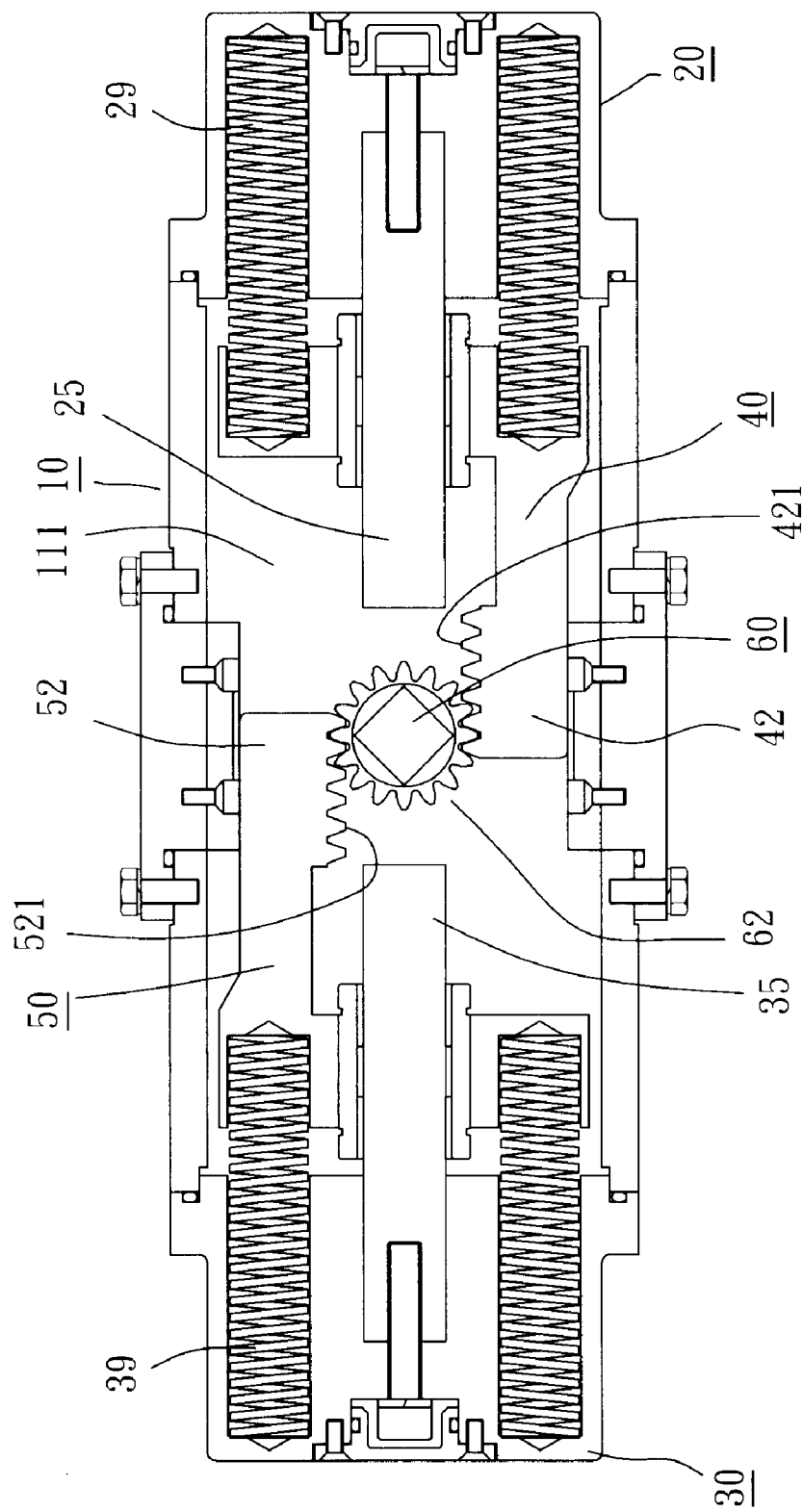
FIG. 14 is a plan view illustrating the right movable part 40 and the left movable part 50 meshing with a pinion 60.
Figure 16:
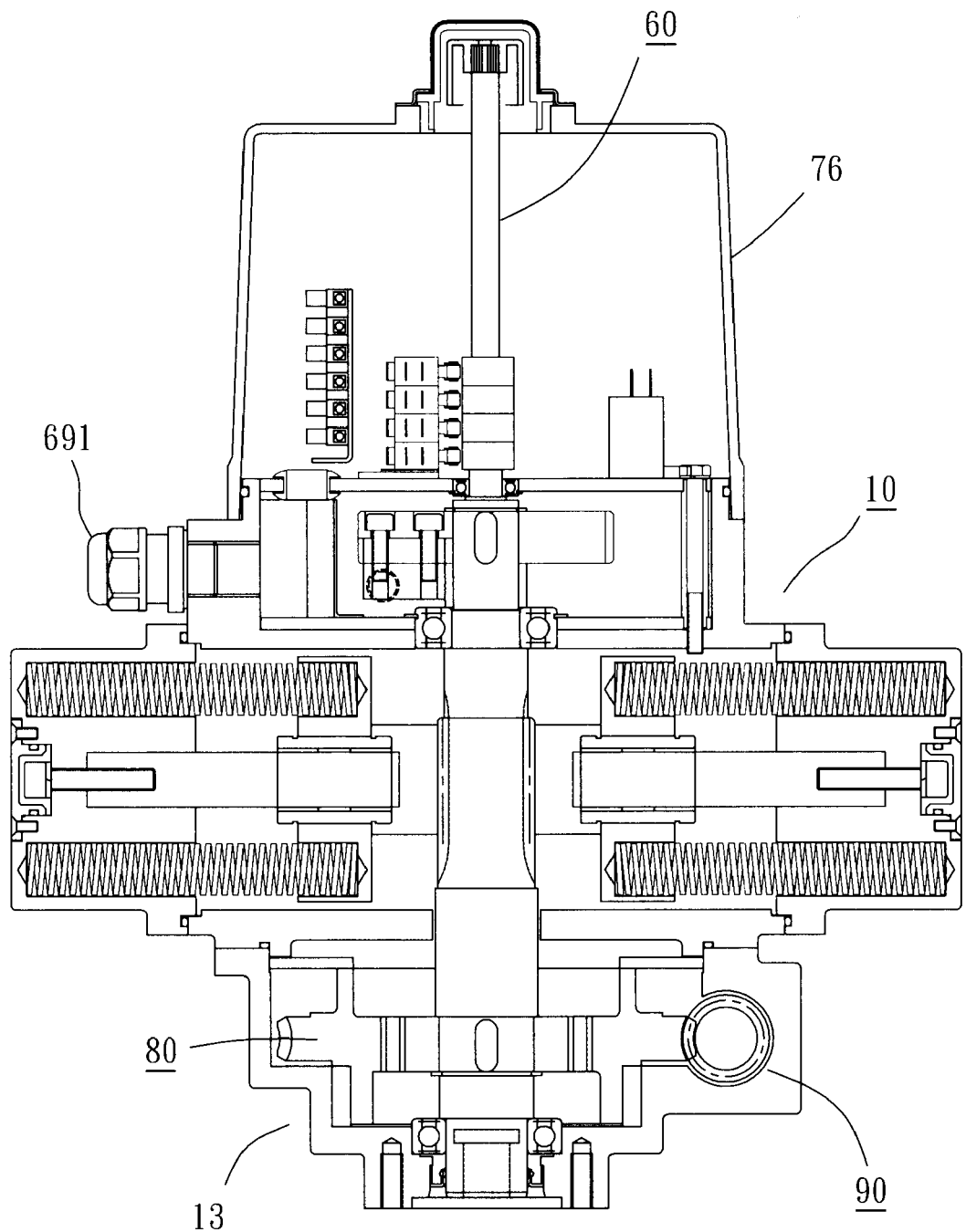
FIG. 16 is a sectional view illustrating the second embodiment of the invention.
Figure 17:
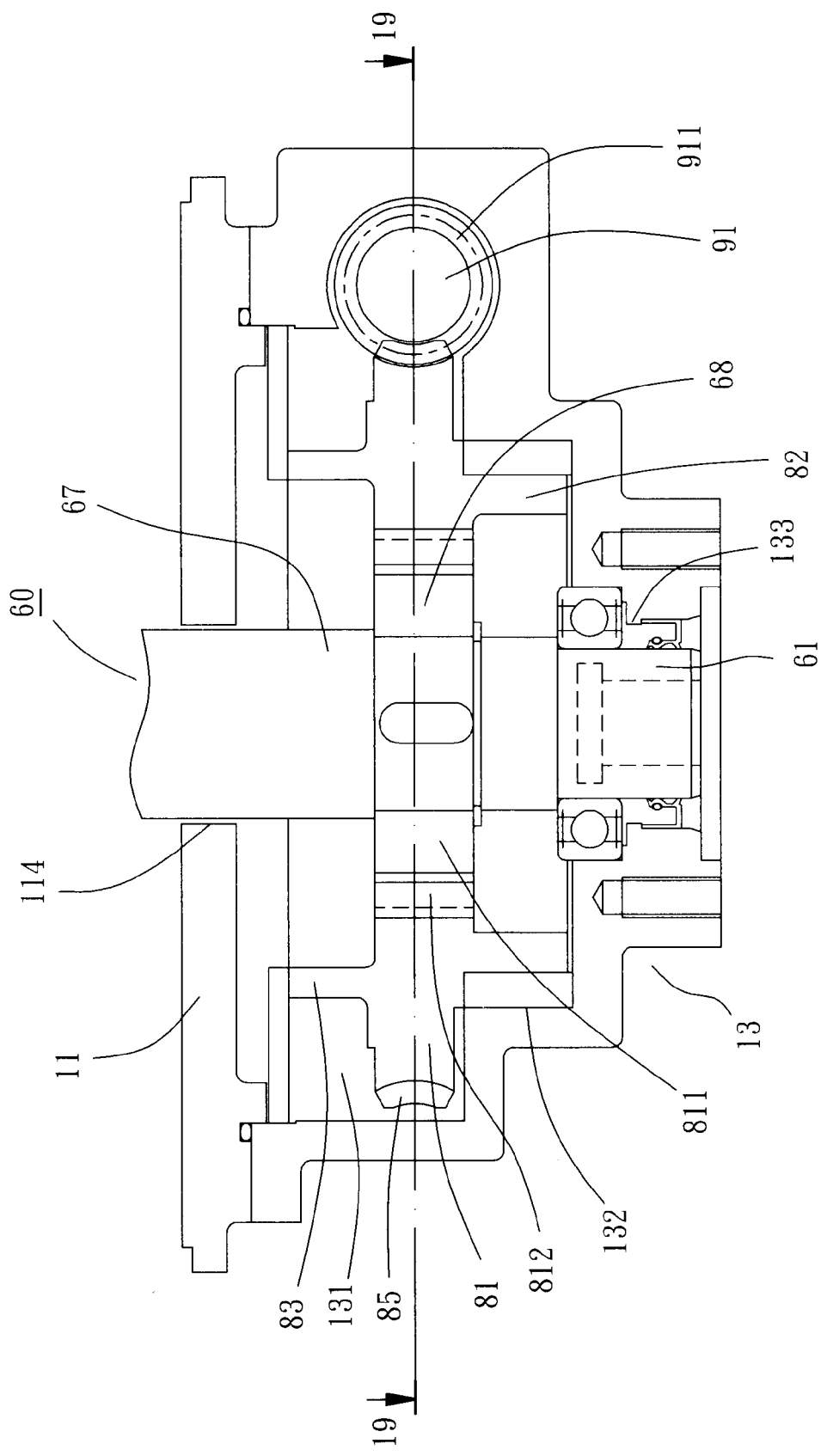
FIG. 17 is a plan view illustrating structural characteristics of the second embodiment of the invention.

In practice, once the motor 70 is powered on to actuate the gear type speed reducer 122 and the output shaft 60 is driven by the speed reducer 122, the gear part 62 of output shaft 60 rotates counterclockwise to urge the left actuating member 50 moving leftward as shown in FIG. 14 to deform and compress the second elastic component 39. Meanwhile, the first actuating member 40 moves rightward synchronously to deform and compress the first elastic component 29. Further, when the output shaft 60 turns 90° with the cam 64 to open or close the valve or any other open and close device, the first flat portion 641 contacts the micro switch 65 to stop the motor 70 running and allow the electromagnet being charged and magnetized as shown in FIG. 15 to attract the movable disk 75 downward against being held by the sticks 751. In this way, the motor 70 keeps unmoved with the output shaft 60 being immobile and the first elastic components and the second elastic components 39 in a state of being deformed and compressed as shown in FIG. 14.

Figure 5:
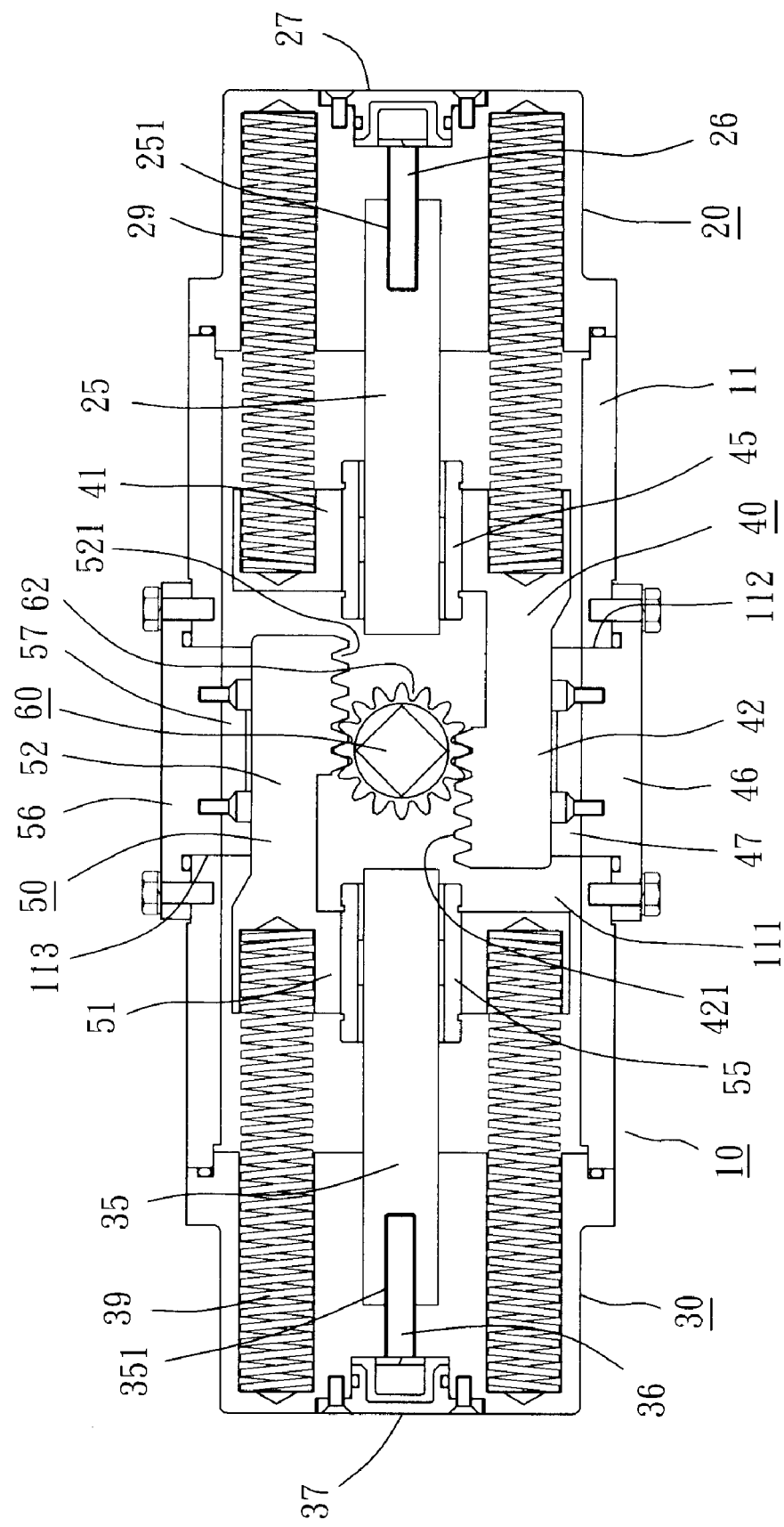
FIG. 5 is a sectional view along line 5-5 shown in FIG. 2.
Figure 6:
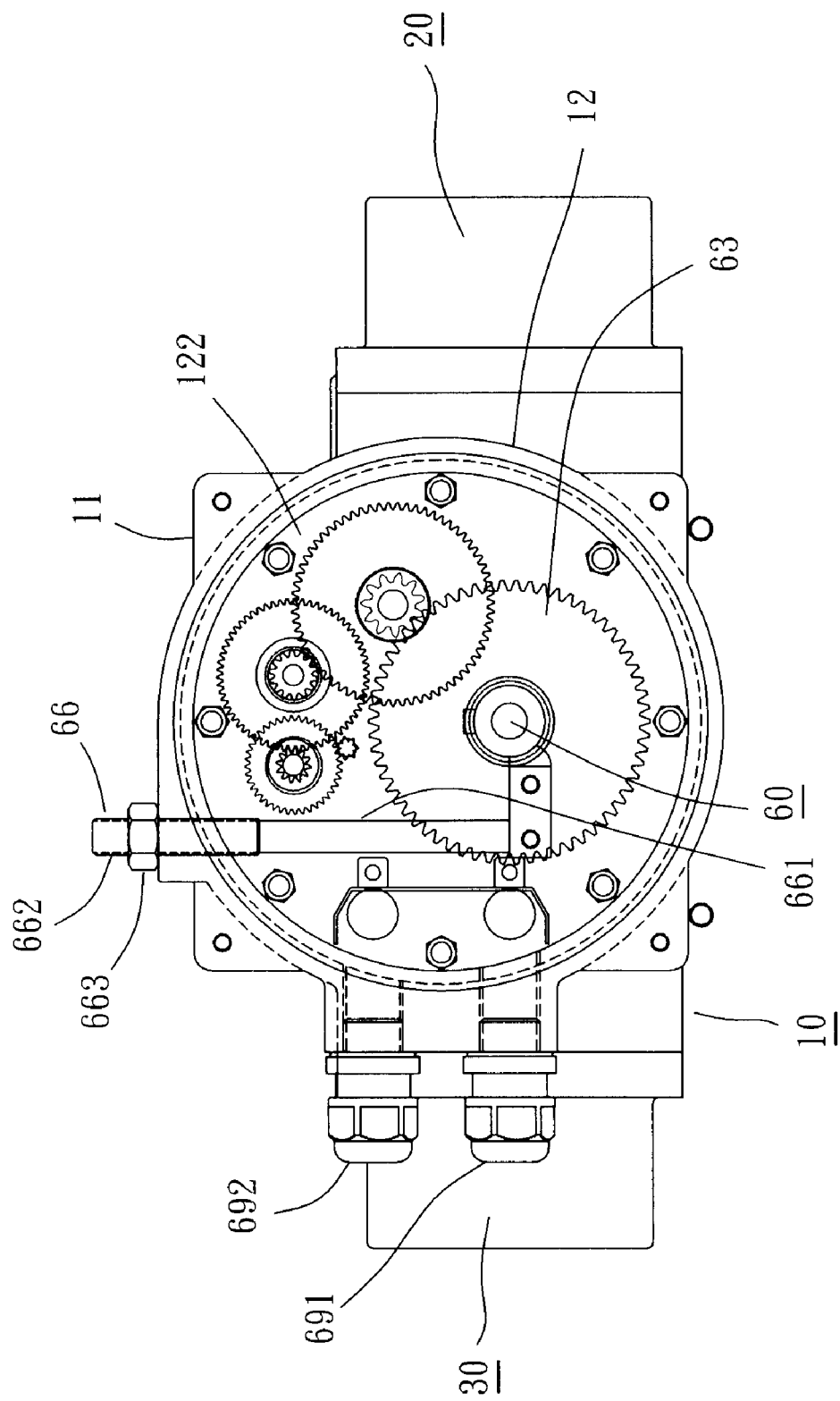
FIG. 6 is a sectional view along line 6-6 shown in FIG. 2.

In case of emergency such as power failure or power off accidentally, the magnetic force of the electromagnet 72 for attracting the movable disk 75 is disappeared and the spring 73 pushes the movable disk 75 back to the original position such that the motor 70 and the output shaft 60 are free from being restrained and the first elastic components 29 and the second elastic components 39 push the right actuating member 40 and the left actuating member 50 back to the original positions as shown in FIG. 5. Further, the output shaft 60 is limited to rotate exact 90° clockwise due to action of the damping device 66 so that the valve or any other open and close device connecting with the lower end of the output shaft 60 is capable of returning to the original open state or closed state conveniently.

Referring to FIGS. 16 to 20, the second embodiment of the invention is illustrated. The difference of the second embodiment from the first embodiment is described hereinafter.

Figure 18:
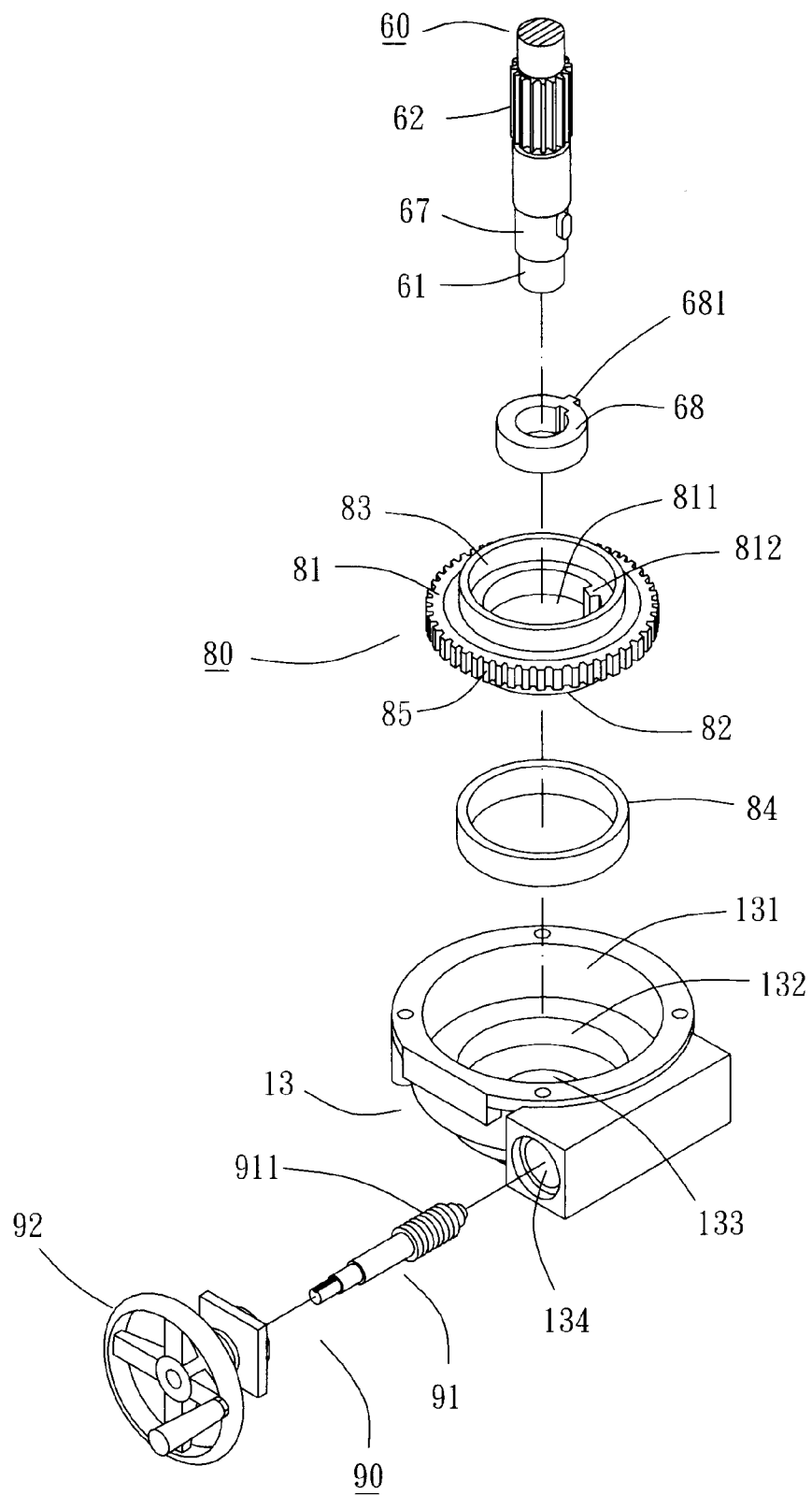
FIG. 18 is an exploded perspective view of the second embodiment of the invention.
Figure 19:
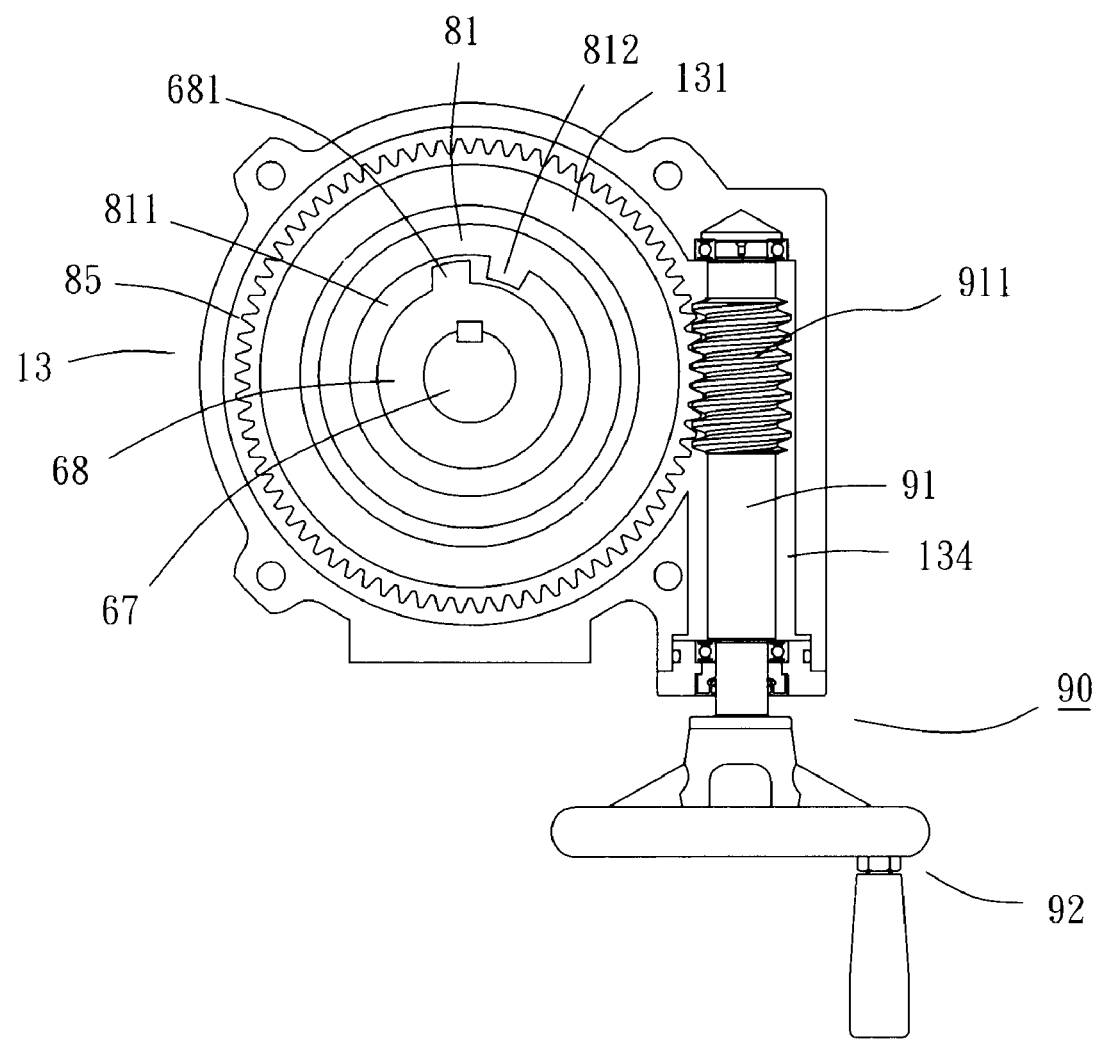
FIG. 19 is a sectional view along line 19-19 shown in FIG. 17.
Figure 20:
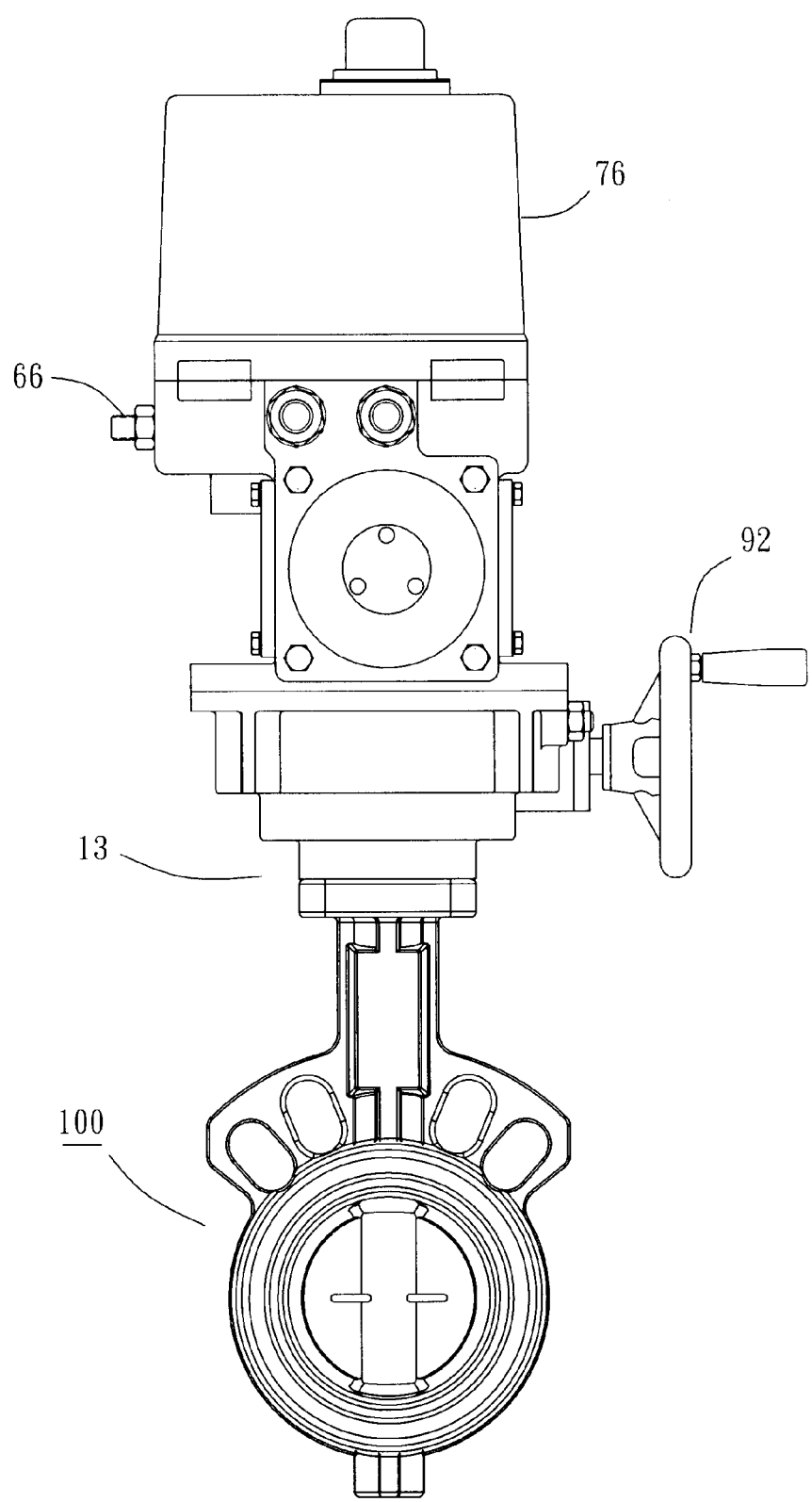
FIG. 20 is a plan view illustrating the second embodiment of the invention being attached to a valve 100.

The main member 11 of the casing base 10 has a lower casing part 13 with a large chamber 131, a small chamber 132 and a lower through hole 133 disposed sequentially from the top to the bottom of the lower casing part 13 respectively as shown in FIG. 18. Further, a rectangular contour with an elongated hole 134 is integrally joined to the outer circumferential side of the lower casing part 13 and the elongated hole 134 communicates the large chamber 131.

A worm gear 80 with worm gear teeth 85 has a middle ring section 81 with a middle hole 811. The inner wall of the middle hole 811 has a first projection 812. A lower ring section 82 extends downward from the middle ring section 81 and an upper ring section extends upward from the middle ring section 83. An intermediate ring element 84, which is made of soft metal such as copper, fits with the outer circumferential side of the lower ring section 82. The worm gear 80 is disposed in the lower casing part 13 in a way of the middle ring section 81 being in the large chamber 131, the lower ring section 82 being in the small chamber 132 and the outer circumferential surface of the intermediate ring element 84 touching the inner wall surface of the small chamber 132.

A worm set 90 has a worm 91 inserted into the long hole 134 of the lower casing part 13 and the worm teeth 911 meshes with the worm gear teeth 85. A handle wheel 92 is attached to the outer end of the worm 91 for turning the worm 91.

An output shaft 60, which is similar to that of the first embodiment, has a joining part 61 and a gear part 62. An extended lower section 67 is provided between the joining part 61 and the gear part 62. An annular fixing block 68 is attached to the extended lower section 67 and a second projection 681 radially extends outward from the outer circumferential surface of the fixing block 68. The joining part 61 of the output shaft 60 passes through the lower opening 114 and is movably disposed in the lower through hole 133. The fixing block 68 is disposed in the middle hole 811 of the worm gear 80 next to the second projection 681.

As the foregoing, the first embodiment of the invention is capable of restoring the valve or any open and close device attached to the joining part 61 of the output shaft 60 to the original state of opening or closing thereof while power failure or power off accidentally. Under this circumstance, when it is required to change the original state of the valve or ant close and open device during the time of lacking the power, the handle wheel 92 can be operated manually to move the worm 91 and the gear teeth 85 of the worm gear wheel 80 is driven with the fixing block 68 by means of the first projection 812 pressing against the second projection 681. In this way, the output shaft 60 can be driven to rotate counterclockwise and the first and second elastic components 29, 39 are compressed again as shown in FIG. 14 such that the valve 100 or any open and close device underneath the output shaft 60 can be closed or opened.

It is noted that once the handle wheel of the second embodiment is employed, the first projection 812 of the worm gear 80 has to be returned to the original position manually in case of power being on again.

While the invention has been described with referencing to preferred embodiments thereof, it is to be understood that modifications or variations may be easily made without departing from the spirit of this invention, which is defined by the appended claims.

What is claimed is:

1. A position restoring apparatus for an open and close device comprising:
 a casing base having a rectangular main member with a hollow seat on top thereof, a long inner hole extending along the axial axis of the main member from a right side to a left side of the main member, the bottom of the hollow seat being a middle opening communicating with the inner hole, a lower opening being disposed at the bottom of the main member corresponding to the middle opening to communicate with the inner hole and a gear speed reducer being received in the hollow seat;
 a first side cover being attached to the right side of the main member to close an end of the inner hole, providing a first axial internal hole and a first axial outer sink, a first middle small hole being disposed between the first axial internal hole and the first axial outer sink such that the first axial internal hole is capable of communicating with the first axial external sink, a first rod fitting with the first axial internal hole with a first threaded hole extending inward from an end of the first rod, a second screw fastener passing through the first middle small hole from the first axial outer sink to engage with the first threaded hole of the first rod, a plurality of first blind holes being disposed to surround the first axial internal hole to accommodate a first elastic component respectively in a way of an end of the first elastic component extending into the inner hole of the casing base;
 a second side cover being attached to the left end side of the main member to close the right end of the inner hole, the second side cover having a second axial internal hole and a second axial outer sink, a second middle small hole being disposed between the second axial internal hole and the second axial outer sink such that the second axial internal hole is capable of communicating with the second axial external sink, a second rod fitting with the second axial internal hole with a second threaded hole extending inward from an end of the second rod, a fourth screw fastener passing through the second middle small hole from the second axial outer sink to engage with the second threaded hole of the second rod, a plurality of second blind holes being disposed to surround the second axial internal hole in the second side cover to accommodate a second elastic component respectively in a way of an end of the second elastic component extending into the inner hole of the casing base;
 a first actuating member having a first disk part with a first central hole and a plurality of third blind holes surrounding the central hole to correspond to the first blind holes, a first elongated block extending from a facial side of the first disk part parallel to the axial line of the first disk part with a first rack section provided at a lateral side of the first block, the central hole of the block being movably attached to a section of the first rod, which extends outward the first axial internal hole with a first oily bearing being arranged in the first central hole;
 a second actuating member having a second disk part with a second central hole and a plurality of fourth blind holes surrounding the second central hole to correspond to the second blind holes, a second elongated block extending from a facial side of the second disk part parallel to the axial line of the second disk part with a second rack section provided at a lateral side of the block, the second central hole of the second block being movably attached to a section of the second rod, which extends outward the second axial internal hole with a second oily bearing being arranged in the second central hole;
 an output shaft having a joining part at the lower end thereof to movably connect with the lower opening of the main member for being attached to an operated valve or an open and any other close device, the joining part having a gear part to mesh with the first rack and the second rack respectively, the output shaft having a gear at a middle section thereof disposed in the hollow seat to mesh with a terminal gear of the gear speed reducer, an upper section of the output shaft having a cam with a flat portion and a micro switch being provided next to the cam, and a damping device being joined to the middle section of the output shaft;

a motor being disposed in the hollow seat and an initial gear of the speed reducer being attached to an end of a motor shaft thereof, another end of the motor shaft extending a rod part with an electromagnet fixedly joined to the lower portion of the rod part, a spring being disposed at the center of the electromagnet and surrounding the motor shaft, the rod part being secured with a stationary disk at the upper end thereof and the stationary disk having three holes spacing apart from each other, a movable disk being disposed under the stationary disk and biased against the spring, three sticks being provided at the movable disk corresponding to the three holes such that the sticks insert through the holes, and an upper cover being provided to close the hollow seat.

2. The position restoring apparatus for an open and close device as defined in claim 1, wherein a front opening and a rear opening are disposed at the front side and the rear side of the main member to communicate with the long inner hole respectively; a front cap is attached to the front opening and a first contact piece, which is made of soft metal, is attached to the rear side of the front cap to pressingly touch another lateral side of the first block opposite to the lateral side with the first rack; a rear cap is attached to the rear opening and a second contact piece, which is made of soft metal, is attached to the front side of the rear cap to pressingly touch another lateral side of the second block opposite to the lateral side with the second rack.

3. The position restoring apparatus for an open and close device as defined in claim 2, wherein the first and the second contact piece are made of copper.

4. The position restoring apparatus for an open and close device as defined in claim 1, wherein a first circular cap is attached to and closes the first axial outer sink and a second circular cap is attached to and closes the second axial outer sink.

5. The position restoring apparatus for an open and close device as defined in claim 2, wherein a first circular cap is attached to and closes the first axial outer sink and a second circular cap is attached to and closes the second axial outer sink.

6. The position restoring apparatus for an open and close device as defined in claim 3, wherein a first circular cap is attached to and closes the first axial outer sink and a second circular cap is attached to and closes the second axial outer sink.

7. The position restoring apparatus for an open and close device as defined in claim 1, wherein the first and the second elastic component are springs.

8. The position restoring apparatus for an open and close device as defined in claim 2, wherein the first and the second elastic components are springs.

9. The position restoring apparatus for an open and close device as defined in claim 3, wherein the first and the second elastic component are springs.

10. The position restoring apparatus for an open and close device as defined in claim 4, wherein the first and the second elastic component are springs.

11. The position restoring apparatus for an open and close device as defined in claim 1, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

12. The position restoring apparatus for an open and close device as defined in claim 2, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

13. The position restoring apparatus for an open and close device as defined in claim 3, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

14. The position restoring apparatus for an open and close device as defined in claim 4, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

15. The position restoring apparatus for an open and close device as defined in claim 5, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

16. The position restoring apparatus for an open and close device as defined in claim 6, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

17. The position restoring apparatus for an open and close device as defined in claim 10, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface of the fixing block such that the joining part of the output shaft passes through the lower opening and is movably disposed in the lower through hole and the fixing block is disposed in the middle hole of the worm gear next to the second projection.

18. A position restoring apparatus for an open and close device comprising:

a casing base having a rectangular main member with a hollow seat on top thereof, a long inner hole extending along the axial axis of the main member from a right side to a left side of the main member and a front opening being disposed at the front side of the main member, a rear opening being disposed at the rear side of the main member to communicate with the inner hole, the bottom of the hollow seat being a middle opening communicating with the inner hole, a lower opening being disposed at the bottom of the main member corresponding to the middle opening to communicate with the inner hole and a gear type speed reducer being received in the hollow seat;

a first side cover being attached to the right side of the main member with a plurality of first screw fasteners to close an end of the inner hole, providing a first axial internal hole and a first axial outer sink, a first middle small hole being disposed between the first axial internal hole and the first axial outer sink such that the first axial internal hole is capable of communicating with the first axial external sink, a first rod fitting with the first axial internal hole with a first threaded hole extending inward from an end of the first rod, a second screw fastener passing through the first middle small hole from the first axial outer sink to engage with the first threaded hole of the first rod, a first circular cap being attached to and closes the first axial outer sink, a plurality of first blind holes being disposed to surround the first axial internal hole to accommodate a first elastic component such as a spring respectively in a way of an end of the first elastic component extending into the inner hole of the casing base;

a second side cover being attached to the left end side of the main member with a plurality of third screw fasteners to close the right end of the inner hole, the second side cover having a second axial internal hole and a second axial outer sink, a second middle small hole being disposed between the second axial internal hole and the second axial outer sink such that the second axial internal hole is capable of communicating with the second axial external sink, a second rod fitting with the second axial internal hole with a second threaded hole extending inward from an end of the second rod, a fourth screw fastener passing through the second middle small hole from the second axial outer sink to engage with the second threaded hole of the second rod, a second circular cap being attached to and closes the second axial outer sink, a plurality of second blind holes being disposed to surround the second axial internal hole in the second side cover to accommodate a second elastic component such as a spring respectively in a way of an end of the second elastic component extending into the inner hole of the casing base;

a first actuating member having a first disk part with a first central hole and a plurality of third blind holes surrounding the central hole to correspond to the first blind holes, a first elongated block extending from a facial side of the first disk part parallel to the axial line of the first disk part with a first rack section provided at a lateral side of the first block, the central hole of the block being movably attached to a section of the first rod, which extends outward the first axial internal hole with a first oily bearing being arranged in the first central hole, a front cap is attached to the front opening and a first contact piece, which is made of soft metal, is attached to the rear side of the front cap to pressingly touch another lateral side of the first block opposite to the lateral side with the first rack;

a second actuating member having a second disk part with a second central hole and a plurality of fourth blind holes surrounding the second central hole to correspond to the second blind holes, a second elongated block extending from a facial side of the second disk part parallel to the axial line of the second disk part with a second rack section provided at a lateral side of the block, the second central hole of the second block being movably attached to a section of the second rod, which extends outward the second axial internal hole with a second oily bearing being arranged in the second central hole, a rear cap is attached to the rear opening and a second contact piece, which is made of soft metal, is attached to the front side of the rear cap to pressingly touch another lateral side of the second block opposite to the lateral side with the second rack;

an output shaft having a joining part at the lower end thereof to movably connect with the lower opening of the main member for being attached to an operated valve or an open and any other close device, the joining part having a gear part to mesh with the first rack and the second rack respectively, the output shaft having a gear at a middle section thereof disposed in the hollow seat to mesh with a terminal gear of the gear speed reducer, an upper section of the output shaft having a cam with a flat portion and a micro switch being provided next to the cam, and a damping device being joined to the middle section of the output shaft;

a motor being disposed in the hollow seat and an initial gear of the speed reducer being attached to an end of a motor shaft thereof, another end of the motor shaft extending a rod part with an electromagnet fixedly joined to the lower portion of the rod part, a spring being disposed at the center of the electromagnet and surrounding the motor shaft, the rod part being secured with a stationary disk at the upper end thereof and the stationary disk having three holes spacing apart from each other, a movable disk being disposed under the stationary disk and biased against the spring, three sticks being provided at the movable disk corresponding to the three holes such that the sticks insert through the holes, and an upper cover being provided to close the hollow seat.

19. The position restoring apparatus for an open and close device as defined in claim 18, wherein the damping device has body part with a outer threaded section for being fastened with a nut once the damping device is adjustably set to prevent from loosening.

20. The position restoring apparatus for an open and close device as defined in claim 18, further comprises a lower casing part under the main member of the casing base with a large chamber, a small chamber and a lower through hole disposed sequentially from the top to the bottom of the lower casing part respectively and a rectangular contour with an elongated hole being integrally joined to the outer circumferential side of the lower casing part and the elongated hole communicating the large chamber; a worm gear with worm gear teeth being disposed in the lower casing part, having a middle ring section with a middle hole, an inner wall of the middle hole having a first projection, a lower ring section extending downward from the middle ring section and an upper ring section extending upward from the middle ring section, an intermediate ring element, which is made of soft metal, fitting with the outer circumferential side of the lower ring section, the middle ring section being in the large chamber, the lower ring section being in the small chamber and the outer circumferential surface of the intermediate ring element touching the inner wall surface of the small chamber; a worm set having a worm inserted into the long hole of the lower casing part and the worm teeth meshing with the worm gear teeth and a handle wheel is attached to the outer end of the worm for turning the worm; and an extended lower section being provided between the joining part and the gear part with an annular fixing block being attached to the extended lower section and a second projection radially extending outward from the outer circumferential surface or the fixing block such that the joining part of the output shaft passes through the lower opening and is movably disposed in the lower through hole and the fixing block is disposed in the middle hole of the worm gear next to the second projection.

* * * * *